United States Patent [19]

Nishimori et al.

[11] Patent Number: 4,711,569

[45] Date of Patent: Dec. 8, 1987

[54] ORIGINAL ILLUMINATION DEVICE WITH AN AUTOMATIC ILLUMINATION CONTROL

[75] Inventors: Kadotaro Nishimori; Keiji Yoshida; Tadashi Ohira, all of Toyokawa, Japan

[73] Assignee: Minolta Camera Kabushiki Kaisha, Osaka, Japan

[21] Appl. No.: 881,460

[22] Filed: Jul. 2, 1986

[30] Foreign Application Priority Data

Jul. 5, 1985 [JP] Japan ................................ 60-148968

[51] Int. Cl.⁴ ............................................. G03B 27/72
[52] U.S. Cl. .................... 355/69; 355/14 R; 355/68
[58] Field of Search ...................... 355/14 E, 14 R, 68, 355/69

[56] References Cited

U.S. PATENT DOCUMENTS

| 4,153,364 | 5/1979 | Suzuki et al. | 355/68 X |
| 4,200,391 | 4/1980 | Sakamoto et al. | 355/68 X |
| 4,272,183 | 6/1981 | Maese et al. | 355/14 R |
| 4,551,005 | 11/1985 | Koichi | 355/14 EX |
| 4,583,839 | 4/1986 | Suzaki | 355/14 R |
| 4,597,662 | 7/1986 | Hirafa et al. | 355/14 R |

Primary Examiner—L. T. Hix
Assistant Examiner—D. Rutledge
Attorney, Agent, or Firm—Price, Gess & Ubell

[57] ABSTRACT

In an original illumination device with an automatic illumination control according to the present invention, light from an exposure lamp (6) illuminates an original (1) and a reference density plate provided on the lower surface of a table (2), reflected light from the original (1) is directed to a photosensitive drum (13), and reflected light from the original (1) and the reference density plate (3) is detected by a photo detector (14), whereby an MPU (17) controls power supply to the exposure lamp (6) by an exposure lamp regulator (19) based on the detection output of the photo detector (14). In addition, in case where a prescribed triggering signal is inputted to the exposure lamp regulator (19) and the photo detector (14) does not detect light, the MPU (17) determines that the exposure lamp (6) is broken, while in case where the prescribed triggering signal is not inputted to the exposure lamp regulator (19) and the photo detector (14) detects light, the MPU (17) determines that it is an abnormal lighting condition. Accordingly, the abnormal condition of the light source can be easily determined by a simple structure.

36 Claims, 6 Drawing Figures

INPUT DATA FOR SETTING OUT FROM THE EXPOSURE LAMP REGULATOR

NUMBER OF CORRECTION OF INPUT DATA TO THE EXPOSURE LAMP REGULATOR

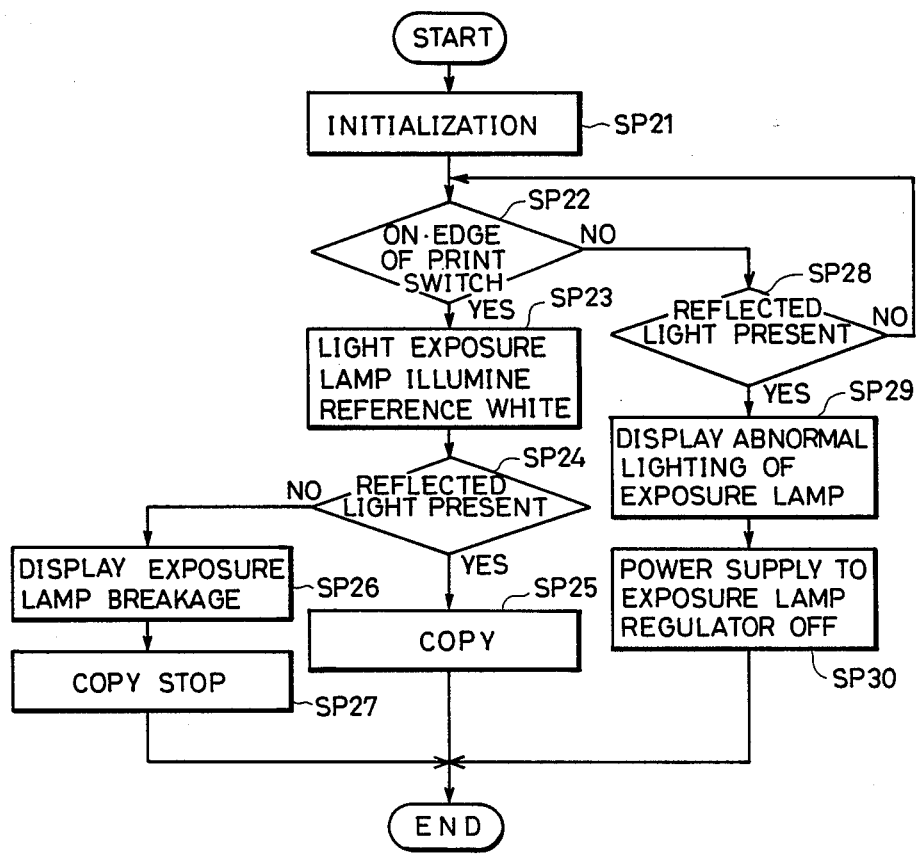

ORIGINAL ILLUMINATION DEVICE WITH AN AUTOMATIC ILLUMINATION CONTROL

BACKGROUND OF THE INVENTION

1. Field of the Invention

The present invention relates to an original illumination device with an automatic illumination control. Particularly, the present invention relates to an original illumination device used in a copying machine or the like, having automatic illumination control including a light receiving element for detecting reflected light from an original illuminated by a lamp. The automatic control is capable of checking any abnormal condition of the lamp and providing a power supply circuit to the lamp through the output of said light receiving element.

2. Description of the Prior Art

In an electrophotographic copying machine, an original document is illuminated by a lamp and reflected light of an image reflected from the original is directed to an uniformly charged photosensitive medium to form an electrostatic image corresponding to the original. The electrostatic image is treated in a known electrophotographic process to obtain a copy.

The density of the background areas of originals to be copied by such an electrophotographic copying machine varies widely, so that clear copies are not always obtained. For example, if an original having a darkish background, such as a newspaper, is illuminated by the same amount of light as is used for an original having a light background, the background of the copy thereof is fogged. A conventional copying machine is provided with a manual density control mechanism for manually changing the copy density in order to obtain clear copies. However, such manual density control mechanism required a trial and error operation, namely, one must take a trial copy and adjust the density according to the condition of the copy in order to obtain a proper copy.

In order to eliminate such troublesome operation, recently a mechanism for detecting the density of the original and for automatically changing the density of the copy according to the detected value has been proposed. For example, automatic copy density control mechanisms are disclosed in U.S. Pat. Nos. 4,153,364 and 4,200,391. In these automatic copy density control mechanisms, the density of the document is optically measured and the amount of light of the lamp or the bias voltage of the developing unit is controlled according to the measurement.

Meanwhile, the lamp utilized in the above described original illumination device is used under severe condition, for example, it is switched on and off intermittently at intervals of several seconds, or it is reciprocated during scanning of the original, so that the lamp often breaks. Since relatively high voltage such as 100 V or 200 V is applied to the lamp, when the lamp is lighted continuously even though where switching off of the lamp is necessary, it becomes extremely hot and may damage units around the lamp. Such being the circumstances, a copying machine provided with a lamp breakage detecting circuit or a monitoring circuit for abnormal lighting of the lamp has been proposed. For example, U.S. Pat. No. 4,272,183 discloses a mechanism for detecting lamp breakage, especially the breakage of an eraser lamp, in which light from a light radiating element connected in series with the eraser lamp is detected by a light receiving element and, in the case where no light from the light radiating element is detected, it is regarded as a lamp breakage and the operation of at least a charger will be stopped.

However, the separate provision of such a lamp breakage detecting circuit or a monitoring circuit for abnormal lighting of the lamp results in an increased cost, more complex structure or more complex control.

Each of the above described problems is similarly encountered not only in a copying machine but also in a reader printer for processing the light image of a microfilm, or in an image reader for optically reading a light image of an original illuminated by a lamp for outputting a digital output.

SUMMARY OF THE INVENTION

Therefore, it is a principal object of the present invention to provide an original illumination device having an automatic illumination control with said device being capable of detecting a malfunction of the lamp for illuminating the original without requiring a particularly designed detection mechanism.

It is another object of the present invention to provide an original illumination device with an automatic illumination control which is capable of automatically maintaining the amount of light for illuminating the original at proper condition as well as detecting malfunctions of the lamp.

Briefly stated, in accordance with the present invention, a power supply means is controlled to make the amount of radiation from a light source proper in response to a signal from a light receiving means disposed in a light path through which light from the original illuminated by the light source passes, malfunctions of the light source is determined in response to the signals from the light receiving means at a prescribed time, and the power supply to the light source is controlled to be stopped according to the determination.

Therefore, according to the present invention, malfunctions associated with the light source for illuminating the originals can be detected without providing an exclusive detection mechanism, whereby neither structure nor control becomes complicated, and the cost will not increase.

In a preferred embodiment of the present invention, when a lighting enabling signal is applied to the light source and the light receiving means does not detect light from the light source, it is regarded as a malfunction. Therefore, in the preferred embodiment of the present invention, the lamp breakage of the light source can be easily determined.

In a more preferred embodiment of the present invention, when there is no lighting enabling signal applied to the light source and the light receiving means detects light from the light source, it is regarded as a malfunction. Therefore, in the preferred embodiment of the present invention, abnormal lighting of the light source can be easily determined.

Furthermore, in a more preferred embodiment of the present invention, items of the malfunctions such as lamp breakage or abnormal lighting are indicated at a display unit, whereby details of the malfunctions can be easily judged from the displayed contents.

These objects and other objects, features, aspects and advantages of the present invention will become more apparent from the following detailed description of the present invention when taken in conjunction with the accompanying drawings.

BRIEF DESCRIPTION OF THE DRAWINGS

FIG. 6 is a flow chart illustrating a specific operation of one embodiment of the present invention.

DESCRIPTION OF THE PREFERRED EMBODIMENTS

Figure 1:
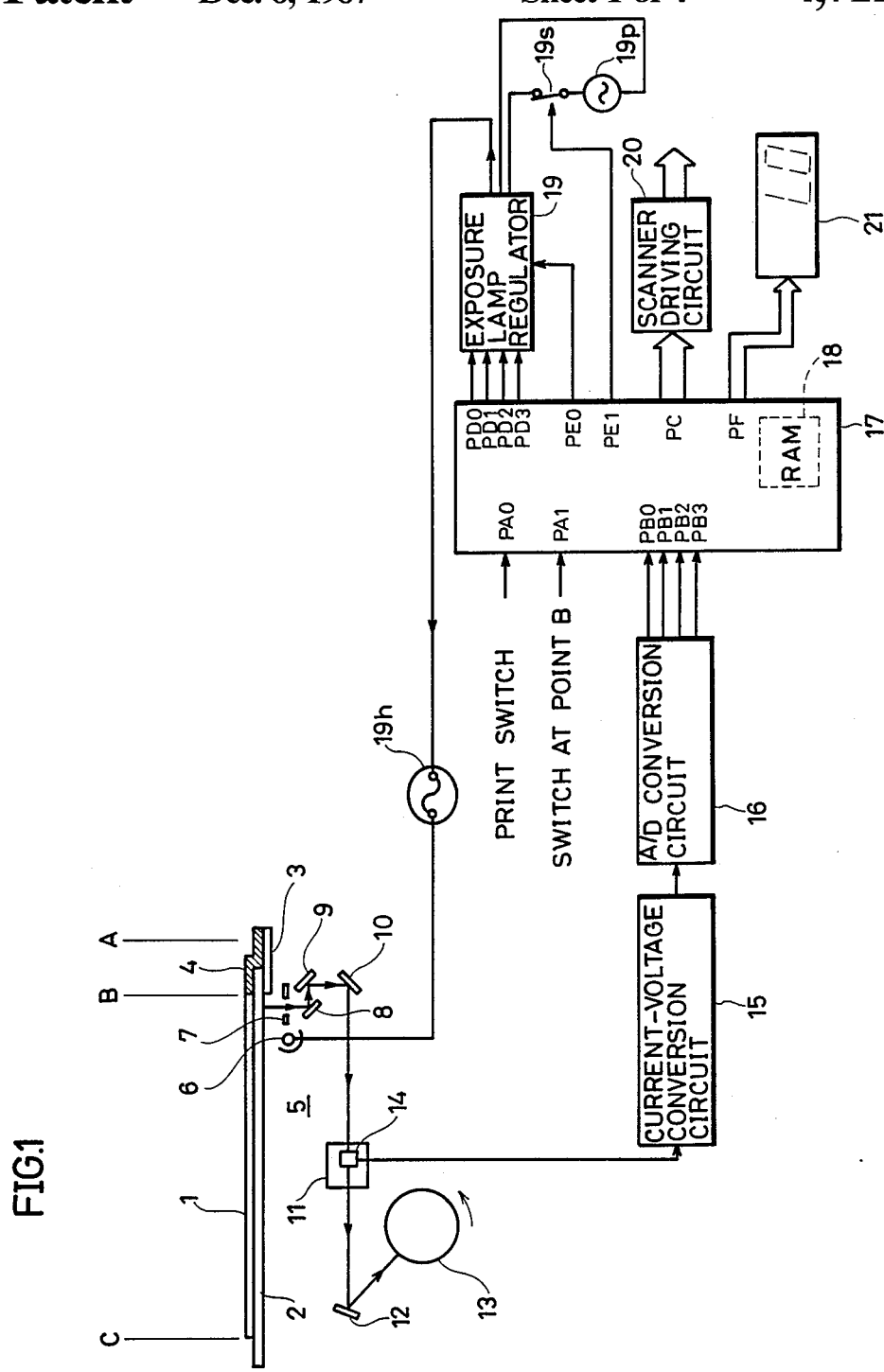
FIG. 1 is a schematic block diagram of a copying machine having an automatic exposure device of sequential correction system, to which one embodiment of the present invention is applied.

FIG. 1 is a schematic block diagram of a copying machine having an automatic exposure device of a sequential correction system, to which one embodiment of the present invention is applied.

At first, the structure of one embodiment of the present invention will be described with reference to FIG. 1. In FIG. 1, an original 1 to be copied is placed on a transparent table 2. An original scale 4 is attached to the table 2, and a reference density plate 3 is fixed to the back surface of the original scale 4. A flat plate of white is commonly used for the reference density plate. This white color is defined as the reference white. A scanner 5 as a scanning optical system for optically scanning the original 1 and the reference density plate 3 beltwisely is disposed below the table 2. The scanner 5 is composed of an exposure lamp 6 which irradiates light, an optical slit 7 for irising in the reflected light, reflection mirrors 8, 9 and 10, an imaging lens 11, a reflection mirror 12, and a machine unit (not shown) for driving these elements in a fixed relation.

The scanner 5 scans from the point A in FIG. 1 to the point C through the point B. Namely, during the operation of the scanner 5, the exposure lamp 6, a first reflection mirror 8 and the optical slit 7 moves leftward in FIG. 1, and scan at first the reference density plate 3 and then the original 1. A second reflection mirror 9 and a third reflection mirror 10 moves leftward in FIG. 1 at a half velocity of the moving velocity of the lamp 6, the first reflection mirror 8 and the optical slit 7 so that the length of the imaging light path becomes constant. There is provided a photosensitive drum 13 which is adapted to rotate in the direction of an arrow in FIG. 1 synchronously with the movement of the scanner 5. A latent electrostatic image corresponding to the picture on the original 1 is formed on the photosensitive drum 13 synchronously with the movement of the scanner 5.

Meanwhile, a photodetector 14 is provided in the projection imaging light path to the photosensitive drum 13, which detects the intensity of the reflected light from the reference density plate 3 and the original 1, namely, the density thereof. The photodetector 14, which is composed of, for example, a light receiving element such as phototransistor or a photodiode, generates current according to the amount of light passing through the optical slit 7. The current signal corresponding to the density outputted from the photodetector 14 is applied to a current-voltage conversion circuit 15 and changed into a voltage signal to be data. The analog voltage signal is applied to an A/D conversion circuit 16 to be converted into a 4-bit digital signal. The digital signal is applied to input ports PB0 to PB3 of a microprocessor (whereinafter referred to as MPU), and the data of that time is stored in an RAM 18 provided in the MPU 17 or in a prescribed register by sampling operation of the MPU 17.

Figure 2:
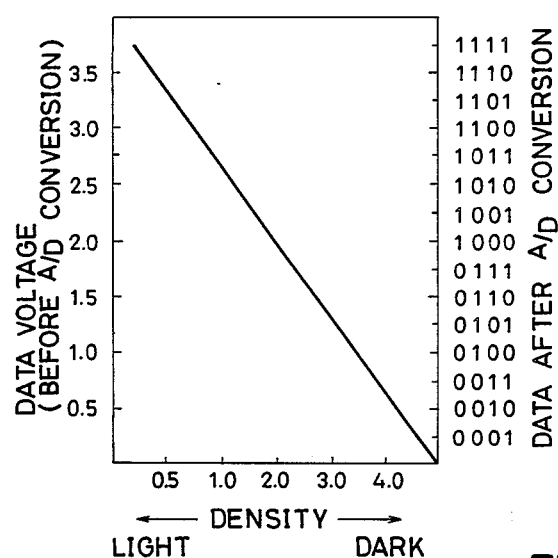
FIG. 2 is a characteristic diagram showing one example of data voltage and data after A/D conversion in relation to the density.

FIG. 2 shows a relation between the output voltage of the current-voltage conversion circuit 15 and the reference white of the reference density plate or the density D of the original as well as the characteristics of the digital value converted by the A/D conversion circuit 16. As is obvious from FIG. 2, the voltage converted by the current-voltage conversion circuit 15 turns to a digital value corresponding to the density D.

Meanwhile, the exposure lamp 6 undergoes a control of its lighting by the exposure lamp regulator 19. In other words, the exposure lamp regulator 19 is on/off controlled by a signal from the output port PE0 of the MPU 17. When the exposure lamp regulator 19 is turned on, the voltage is supplied to the exposure lamp 6 through a thermal fuse 19h to light the exposure lamp 6 and the exposure lamp 6 is lighted. AC100V is supplied to the exposure lamp regulator 19 from an alternative voltage source 19p through a normally closed power supply cut-off switch 19s which turns off responsive to a control signal from an output port PE1 of the MPU 17. The voltage outputted from the exposure lamp regulator 19 is controlled by 4-bit digital data outputted from the output ports PD0 to PD3 of the MPU 17.

Figure 3:
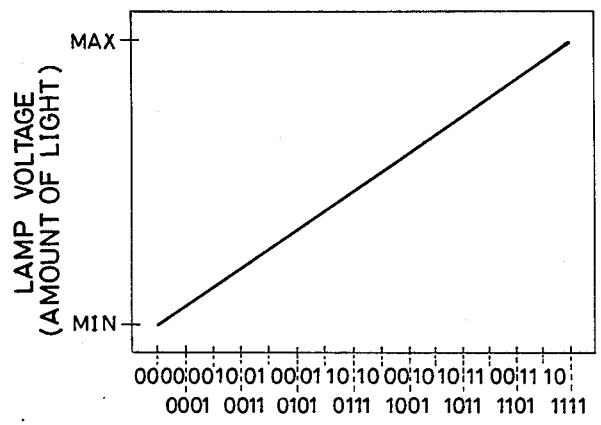
FIG. 3 is a characteristic diagram of the exposure lamp regulator.
Figure 4:
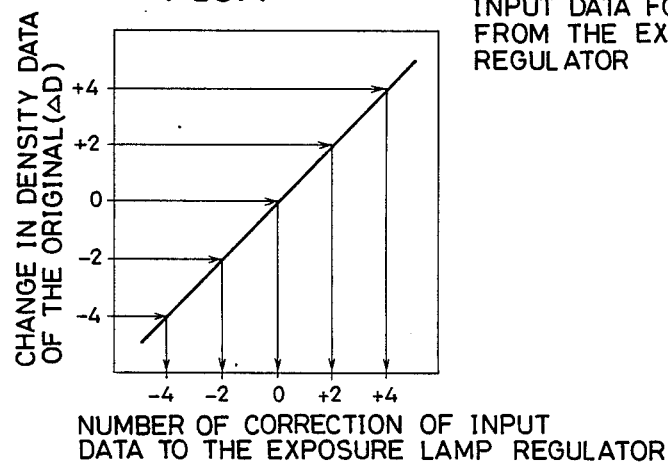
FIG. 4 is a characteristic diagram showing a relation between the number of correction of input data to the exposure lamp regulator and the amount of change in the density data.

FIG. 3 shows characteristics of the digital data, that is, the input data for setting the output of the exposure lamp regulator and the supply voltage to the exposure lamp 6, that is, the amount of radiation of the exposure lamp 6. As is obvious from the FIG. 3, the amount of light of the exposure lamp 6 changes responsive to the input data for setting the output of the exposure lamp regulator. The input data for setting the output of the exposure lamp regulator changes successively in accordance with the density data inputted to the input ports PB0 to PB3 of the MPU 17 during scanning the original 1. The mode of the change is set in advance to represent a linear relation as shown in FIG. 4. Namely, each density change of the original ΔD after A/D conversion corresponds to the amount of each change (number of correction) of the input data to the exposure lamp regulator 19. For example, the average value of the sampling density data of the reference white is "1100" and the density data of the original 1 is "1010", then subtraction of the later from the former leaves "0010" of a binary number. Namely, the density of the original has +2 of difference from the reference white, that is, it is denser by +2 than the reference white.

In order to equalize the amount of reflected light with that of the reference white, the amount of light of the exposure lamp 6 must be increased. This is accomplished by correcting the input data of the exposure lamp regulator 19 by +2 by virtue of the characteristics shown in FIG. 4.

In FIG. 1, a display 21 having 4 digits each of 7-segment type is connected to the MPU 17. The display 21 displays the number of copies to be copied or magnification responsive to the code data outputted from the output port PF of the MPU 17 and, in addition, it displays the condition of the copying machine in the form of codes. When a print key, not shown, is operated to start the copying operation, the switch signals thereof is inputted to the input port PA0 of the MPU 17, the exposure lamp regulator 19 is turned on through the output port PE0 in response thereto, the exposure lamp 6 is lighted and, at the same time, a scanner driving circuit 20 is activated by a scanner control signal outputted from the output port PC and then the scanner 5 begins scanning operation from the point A as described above.

Figure 5:
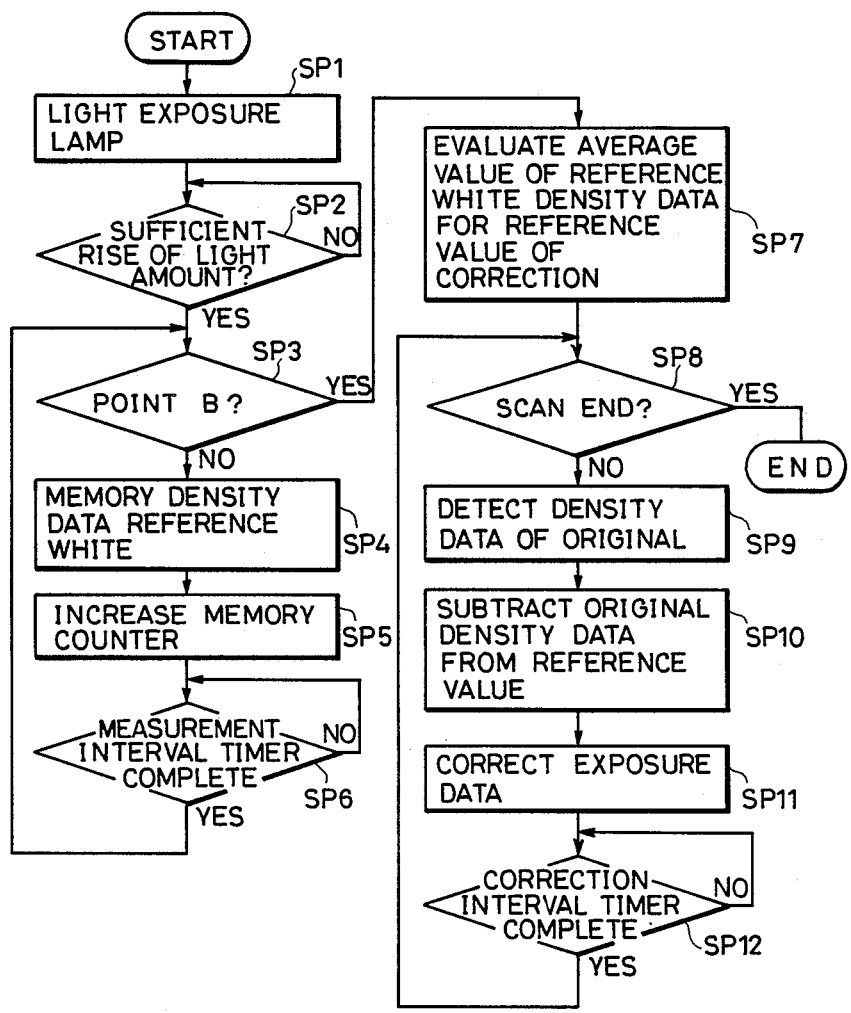
FIG. 5 is a flow chart illustrating a procedure of automatic exposure control according to the sequential correction.

FIG. 5 is a flow chart illustrating the operation of the automatic exposure control according to the sequential correction and FIG. 6 is a flow chart illustrating practical operation of one embodiment of the present invention.

Now, the practical operation of the sequential exposure control will be described with reference to FIG. 5. In FIG. 5, the density data of the reference white of the reference density plate 3 is sampled during steps (in the drawings briefly indicated as SP) SP1 to SP6 and the density data of the original 1 is detected by area unit obtained by beltwisely dividing the original to correct the amount of radiation on a real time basis during steps SP7 to SP12.

More specifically, the MPU 17 lights the exposure lamp 6 at the step SP1. Namely, the MPU 17 turns the exposure lamp regulator 19 on through the output port PE0. At step SP2, the MPU 17 determines whether the rise of the amount of light of the exposure lamp 6 is sufficient or not. If it is not sufficient, it awaits until the amount of light of the exposure lamp 6 attains to a prescribed amount. When the amount of light of the exposure lamp 6 attains to a prescribed amount, at step SP3, it determines whether the scanner 5 reached the position of the point B or not. There is provided a switch means, not shown, corresponding to the position of the point B in FIG. 1, and this switch means is turned on when the scanner 5 passes the position of the point B. This signal is applied to the input port PA1 of the MPU 17, namely, during the step SP3, whether the switching signal exists or not is determined.

If the MPU 17 determines that the scanner 5 has not reached the position of the point B, density data of the reference white of the reference density plate 3 is detected at every sampling cycle defined by a measurement interval timer hereinafter described with reference to step SP6, and stored in the RAM 18 at the step SP4. Furthermore, the MPU 17 increases a counter for counting the number of storage of the data in the RAM 18 at the step SP5. At the step SP6, the MPU 17 determines completion of counting by measurement interval timer which determines time for sampling the density data of the reference white. When the completion is determined, it returns to the aforementioned step SP3, and repeats these steps SP3 to SP6.

If the MPU 17 determines that the scanner 5 has reached the position of the point B at the step SP3, it advances to the step SP7. At this step SP7, the average value of the density data of the reference white is evaluated. Namely, the MPU 17 adds all data stored in the RAM 18, and divides the sum by the number counted at the step SP5 to obtain the average value. The result of the evaluation is defined as a reference value for the subsequent correction control. At the step SP8, the MPU 17 determines whether the scanning is finished or not, and if it determines that the scanning is finished, it finishes the above described series of the routine process.

If scanning is not finished, at the step SP9, the average density of the band area of the original 1, more precisely the area of the original corresponding to the slit width of the optical slit 7 is detected. The data of the average density is stored in a prescribed register through input ports PB0 to PB3. At the step SP10, the MPU 17 carries out a subtraction of the original density data detected at the above described step SP9 from the reference value data set at the step SP7 to evaluate the difference ΔD. At the step SP11, the MPU 17 corrects the exposure data, that is, the input data for setting the output of the exposure lamp regulator 19. In other words, the MPU 17 outputs the sum of the exposure data for illuminating the reference density plate 3 and the difference ΔD obtained at the above described step SP10. At the step SP12, the MPU 17 determines the completion of counting by a correction interval timer which applies a time interval for sequentially correcting the amount of radiation to the original 1. If the counting of the timer is not completed, the MPU 17 waits until the completion, and then it returns to the aforementioned step SP8, to repeat the above described steps until the scanner 5 finishes scanning.

By virtue of the above described control, the amount of reflected light from an arbitrary area of the original 1 becomes constant, providing good copies without fogs.

Next, the detection of abnormal conditions of the exposure device in one embodiment of the present invention will be described with reference to FIGS. 1 and 6. First, at the start of the program of FIG. 6, the MPU 17 performs initialization at the step SP21. This initialization means a process for setting variable items of operation for the copying machine at a standard condition, such as setting the indication of the display 21 for copying quantity at "1", or a process for clearing the register or the RAM 18 in the MPU 17. After the initialization, the MPU 17 advances to the step SP22, and determines whether the output of the print switch is turned on or not. Namely, it determines whether or not a switching signal by the operation of the print key is inputted to the input port PA0 of the MPU 17. When it determines that the output of the print switch is turned on, it advances to the step SP23.

At the step SP23, the MPU 17 lights the exposure lamp 6 to illuminate the reference density plate 3. In other words, the MPU 17 outputs an on signal from the output port PE0 to activate the exposure lamp regulator 19, and then outputs referential exposure data from the output ports PD0 to PD3. Accordingly, the exposure lamp 6 disposed on a position corresponding to the point A is lighted to illuminate the reference density plate 3. At the step SP24, the MPU 17 determines whether there is a reflected light from the reference density plate 3 or not. Namely, the MPU 17 takes the input data from the input ports PB0 to PB3, and determines whether the input data is the maximum value of the density data, for example "0000" in the characteristic example of FIG. 2, or not. If there is reflected light, usually it becomes the reference value "1000", so that the normal operation of the exposure lamp 6 is confirmed. When the MPU 17 determines that there is reflected light, it advances to the step SP25 and carries out the copying operation while performing exposure control by sequential correction described above with reference to FIG. 5.

Meanwhile, the determination of the existence or nonexistence of the reflected light at the step SP24 may be carried out through not only once but twice or third times of sampling at a prescribed time interval.

If the MPU 17 determines that there is no reflected light at the above described step SP24, the MPU 17 advances to the step SP26. Namely, in case where the MPU 17 has instructed to light the exposure lamp 6 but there is no reflection light, then the MPU 17 determines that the exposure lamp 6 is out of order and displays that condition on the display 21. Namely, it displays "LO" on the display 21 shown in FIG. 1 as a code display of lamp out. Upon completion of the display process, it proceeds to the step SP27 to stop the copying operation. For example, the MPU 17 resets a copy flag at "0", and stops the operation of the copying operational elements such as the scanner driving circuit 20 and the like. Thus, according to one embodiment of the present invention, the detection of the lamp breakage can be carried out before the beginning of the scanning, so that a user may not be surprised at a copy of solid black.

Meanwhile, at the aforementioned step SP22, when the MPU 17 does not determine that the output of the print switch is turned on, it proceeds to the step SP28. At this step SP28, it is determined that whether there is reflected light or not in case where the starting of the copying operation is not ordered. Namely, the abnormal lighting of the exposure lamp 6 is determined. Similar to the aforementioned step SP24, it is determined that whether the input data of the input ports PB0 to PB3 is "0000" or not. If the input data is "0000", then it is determined that it is normally operating and returns to the aforementioned step SP22. However, if the MPU 17 determines that the input data is other than "0000", it immediately proceeds to the step SP29 since the exposure lamp 6 is abnormally lighting, and then indicates the abnormal lighting of the exposure lamp 6. Namely, it displays "LA" on the display 21 as a code indication of lamp abnormal. At the same time, the MPU 17 turns off the power supply to the exposure lamp regulator 19 at the step SP30. Namely, a control signal is outputted from the output port PE1 of the MPU 17 to open the power supply cut-off switch 19s. Accordingly, management for the abnormal conditions can be carried out before the operation of other power supply cut-off means such as the thermal fuse 19h shown in FIG. 1. In a conventional device, the thermal fuse 19h might be blown due to an abnormal voltage applied to the exposure lamp 6. However, according to one embodiment of the present invention, detection of the abnormal conditions can be carried out before the operation of abnormal detection means such as the thermal fuse, which requires replacement upon detection, so that it is advantageous with respect to the maintenance.

Although monitoring the abnormal conditions of the exposure lamp 6 and the exposure lamp regulator 19 has been described with reference to one embodiment of the present invention, a periodic change of the exposure lamp 6 on a monthly or yearly basis may be checked according to the same concept to perform the adjustment and maintenance of the picture density of a copy.

Although in the above described embodiment description was made on the case of copying an original 1 with this invention applied to a copying machine, the object of the exposure control may be films, and it may be generally applied to negatives. Although the detection of abnormal conditions concerned with the exposure lamp was described in the foregoing, the light source is not particularly limited thereto but the present invention may be applied to any other types of light sources, such as a photodiode, photodiode allay or a laser, similar to one embodiment of the present invention. In addition, the density to be detected may be transparent density as well as reflection density.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An original illumination device comprising
   illuminating means including a light source for illuminating an original;
   power supply means for supplying power to said light source;
   automatic illumination control means including light receiving means disposed in a light path through which light from the original illuminated by said light source passes, and outputting a signal corresponding to the amount of light received, for controlling said power supply means to accommodate the amount of radiation of said light source responsive to the signal from said light receiving means;
   malfunction determining means for determining a malfunction concerned with said light source responsive to a signal from said light receiving means at a prescribed time; and
   malfunction control means for controlling power supply to said light source to be stopped in response to the determination of malfunction by said malfunction determining means.

2. An original illumination device according to claim 1, further comprising:
   means for applying a light enabling signal to said light source, and wherein
   said malfunction determining means includes means for determining that it is a malfunction in the case where a light enabling signal is applied to said light source and no light from said light source is detected by said light receiving means.

3. An original illumination device according to claim 1, further comprising:
   means for applying a light enabling signal to said light source, and wherein
   said malfunction determining means includes means for determining that it is a malfunction in the case where no light enabling signal is applied to said light source and light from said light source is detected by said light receiving means.

4. An original illumination device according to claim 1, further comprising
   display means for displaying a malfunction.

5. An original illumination device according to claim 4, wherein
   said display means includes a member for displaying items of a malfunction responsive to the result of determination by said malfunction determining means.

6. An original illumination device according to claim 1, wherein
   said illumination means includes a member which moves relatively to said original, and said light source is provided on said member.

7. An original illumination device according to claim 6, wherein
said malfunction determining means includes means for performing determination prior to the beginning of the movement of said relatively moving member.

8. An original illumination device according to claim 6, wherein
said illuminating means comprises means including a reference chart member provided opposed to a movement starting position of said relatively moving member, for performing malfunction determination in response to the existence or nonexistence of reflected light from said reference chart member.

9. An original illumination device according to claim 1, wherein
said malfunction control means comprises a switch provided between said power supply means and a power source, and means for turning said switch off in the case where said malfunction determining means indicates a malfunction that said light source is lighting without a lighting enabling signal applied to said light source.

10. An original illumination device for use with a copying machine or the like, comprising:
illuminating means including a light source for illuminating an original;
power supply means for supplying power to said light source;
light receiving means disposed in a light path through which light from the original illuminated by said light source passes, for outputting a signal corresponding to the amount of light received;
automatic illumination control means for controlling said power supply means to accommodate the amount of radiation of said light source responsive to the signal from said light receiving means;
malfunction determining means for outputting a malfunction signal in the case where a lighting enabling signal is applied to said light source and no light from said light source is detected by said light receiving means; and
malfunction control means for controlling said power supply means to stop said power supply means responsive to the malfunction signal from said malfunction determining means.

11. An original illumination device according to claim 10, including a power source wherein
said malfunction control means comprises a switch provided between said power supply means and said power source, and means for turning said switch off responsive to said malfunction signal.

12. An original illumination device according to claim 10, further comprising
display means for displaying a malfunction.

13. An original illumination device according to claim 12, wherein
said display means includes a member for displaying items of a malfunction corresponding to the result of determination by said malfunction determining means.

14. An original illumination device according to claim 10, wherein
said illuminating means includes a member which moves relatively to said original, and said light source is provided on said member.

15. An original illumination device according to claim 14, wherein
said malfunction determining means comprises means for performing a malfunction determination prior to the beginning of movement of said relatively moving member.

16. An original illumination device according to claim 14, wherein
said illuminating means comprises a reference chart member provided adjacent to a movement starting position of said relatively moving member, and means for performing malfunction determination in response to existence or nonexistence of reflected light from said reference chart member.

17. An original illumination device for use with a copying machine or the like, comprising:
illuminating means including a light source for illuminating an original;
power supply means for supplying power to said light source;
light receiving means disposed in a light path through which light from the original illuminated by said light source passes, for outputting a signal corresponding to the amount of light received;
automatic illumination control means for controlling said power supply means to accommodate the amount of radiation of said light source responsive to said signal from said light receiving means;
malfunction determining means for outputting a malfunction signal in the case where no lighting enabling signal is applied to said light source and light from said light source is detected by said light receiving means; and
malfunction control means for controlling said power supply to said light source to be stopped responsive to said malfunction signal from said malfunction determining means.

18. An original illumination device according to claim 17, including a power source wherein
said malfunction control means comprises a switch provided between said power supply means and said power source, and means for turning said switch off responsive to said malfunction signal.

19. An original illumination device according to claim 17, further comprising
display means for displaying a malfunction.

20. An original illumination device according to claim 19, wherein
said display means comprises means for displaying items of a malfunction corresponding to the result of determination by said malfunction determining means.

21. An original illumination device according to claim 17, wherein
said illuminating device comprises a member moving relatively to said original, and said light source is provided on said member.

22. An original illumination device according to claim 21, wherein
said malfunction determining means comprises means for performing malfunction determination prior to the beginning of movement of said relatively moving member.

23. An original illumination device according to claim 21, wherein
said illuminating means comprises means including a reference chart member provided adjacent to a movement starting position of said relatively moving member, for performing malfunction determination in response to the existence or nonexistence of reflected light from said reference chart member.

24. A device for producing outputs corresponding to an original, comprising:
   a platen on which the original is placed;
   a light source for illuminating the original on said platen;
   power supply means for supplying power to said light source;
   a photosensitive element for receiving a picture of said original;
   light transmitting means for guiding said picture of said original to said photosensitive element;
   outputting means for producing an output signal corresponding to the picture of the original guided to said photosensitive element;
   light receiving means disposed in a light path of said light transmitting means for outputting a signal corresponding to the amount of light received;
   automatic illumination means for controlling said power supply means to accommodate the amount of radiation of said light source responsive to the signal from said light receiving means;
   malfunction determining means for determining malfunction concerned with said light source responsive to a signal from said light receiving means at a prescribed time for outputting a malfunction signal; and
   malfunction control means for controlling power supply to said light source to be stopped in response to the malfunction signal from said malfunction determining means.

25. A device according to claim 24, further comprising:
   a lighting enabling means for outputting a light enabling signal for enabling said light source, wherein
   said malfunction determining means comprises means for outputting a malfunction signal in the case where a lighting enabling signal is outputted from said lighting enabling means and no light from said light source is received at said light receiving means.

26. A device according to claim 24, further comprising
   lighting enabling means for outputting a light enabling signal for enabling said light source, wherein
   said malfunction determining means comprises means for outputting a malfunction signal in the case where no lighting enabling signal is outputted from said lighting enabling means and light from said light source is received at said light receiving means.

27. A device according to claim 24, further comprising
   lighting enabling means for outputting a light enabling signal for enabling said light source, and wherein
   said malfunction determining means comprises
   means for outputting a first malfunction signal in the case where a light enabling order is outputted from said lighting means and no light from said light source is received at said light receiving means, and
   means for outputting a second malfunction signal in the case where no light enabling order is outputted from said lighting means and light from said light source is received at said light receiving means.

28. A device according to claim 25, wherein
   said malfunction control means comprises control means for stopping power supply from said power supply means in response to said malfunction signal 29. A device according to claim 26, further comprising, a power source
   a switch provided between said power supply means and said power source, and wherein
   said malfunction control means comprises means for turning said switch off corresponding to said malfunction signal.

30. A device according to claim 27, further comprising, a power source
   a switch provided between said power supply means and said power source, and wherein
   said malfunction control means is adapted to control said power supply means to stop power supply means responsive to said first malfunction signal and, comprises means for turning said switch off responsive to said second malfunction signal.

31. A device according to claim 28, further comprising
   display means for displaying a malfunction responsive to said malfunction signal.

32. A device according to claim 29, further comprising
   display means for displaying a malfunction responsive to said malfunction signal.

33. A device according to claim 30, further comprising
   display means for performing respective display of a malfunction responsive to said first or second malfunction signal.

34. A device according to claim 24, wherein
   said light transmitting means comprises a member moving along said platen, and
   said light source is provided on said member.

35. A device according to claim 34, wherein
   said malfunction determining means comprises means for performing said malfunction determination prior to the movement for illuminating said original of said moving member.

36. A device according to claim 34, wherein
   said platen comprises a reference chart member provided opposed to a movement starting position of said moving member and, said malfunction determining means comprises means for performing malfunction determination according to the existence or nonexistence of reflected light from said reference chart member.

* * * * *